United States Patent [19]

Morimoto

[11] Patent Number: 4,854,524
[45] Date of Patent: Aug. 8, 1989

[54] DRAG MECHANISM FOR A DOUBLE-BEARING FISHING REEL

[75] Inventor: Shinichi Morimoto, Nishiomiya, Japan

[73] Assignee: Shimano Industrial Company Limited, Osaka, Japan

[21] Appl. No.: 171,893

[22] Filed: Mar. 22, 1988

[30] Foreign Application Priority Data

Mar. 26, 1987 [JP] Japan .............................. 62-45196[U]

[51] Int. Cl.⁴ ............................................. A01K 89/02
[52] U.S. Cl. ....................................... 242/268; 242/266
[58] Field of Search ............... 242/211, 217, 218, 219, 242/84.5 R; 464/35, 37, 77; 188/72.3, 83

[56] References Cited

U.S. PATENT DOCUMENTS

| 3,425,644 | 2/1969 | Griste | 242/219 X |
| 3,478,979 | 11/1969 | Henze | 242/219 X |
| 4,516,741 | 5/1985 | Hashimoto | 242/217 |
| 4,634,079 | 1/1987 | Furomoto | 242/219 |

FOREIGN PATENT DOCUMENTS 57-39027  8/1982  Japan .

*Primary Examiner*—David Werner
*Assistant Examiner*—Phillip Han
*Attorney, Agent, or Firm*—Stevens, Davis, Miller & Mosher

[57]  ABSTRACT

A drag mechanism for a double-bearing fishing reel is provided, which includes drag members provided between a handle shaft and a main gear, a setting member which is operated to set a slipping rotation starting load on a spool, an adjuster which adjusts a preset optimum load within a predetermined range, a reference portion provided at one of the setting member and the adjuster, and a position setting portion corresponding to the reference portion provided at the other of the setting member and the adjuster. The adjuster can easily and accurately return, after adjustment of the load, to the position where the optimum load is set.

10 Claims, 2 Drawing Sheets

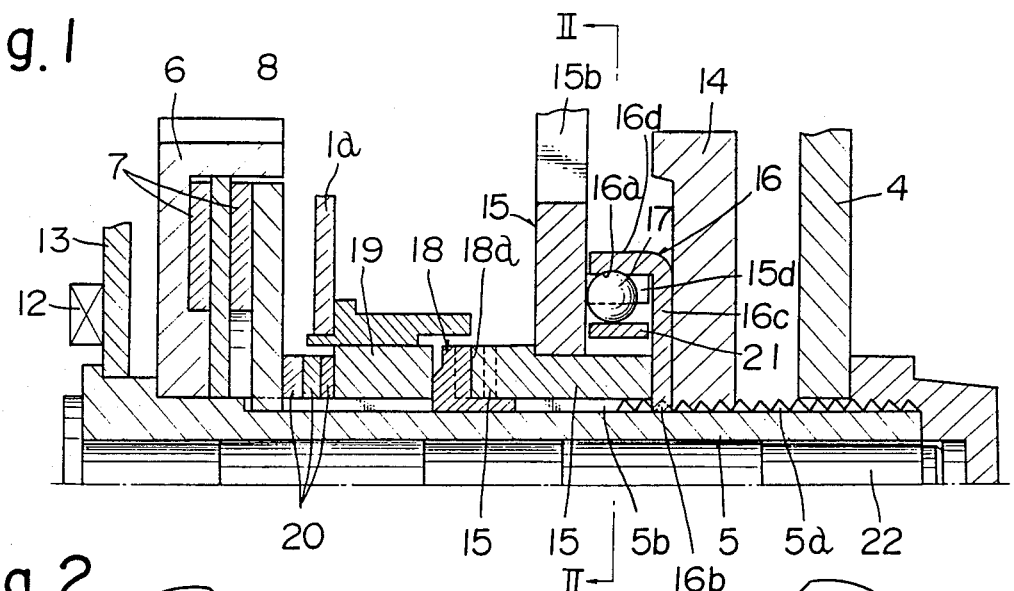
Fig.1
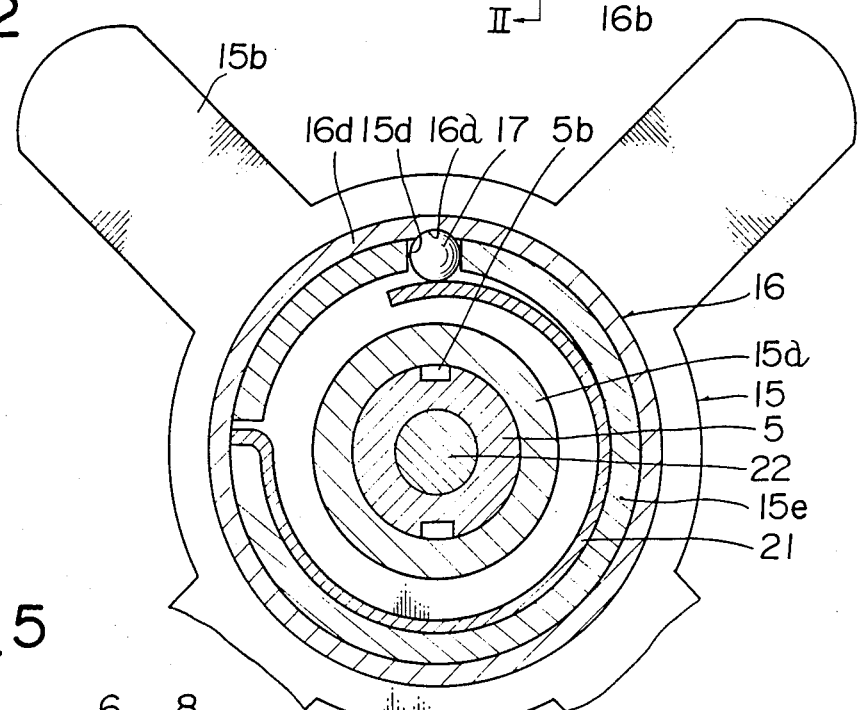
Fig.2
Fig.5
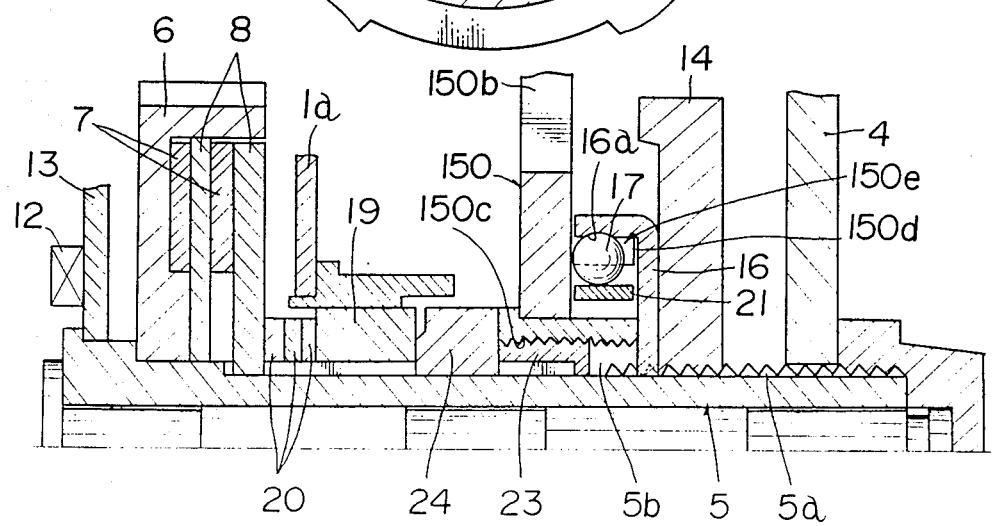

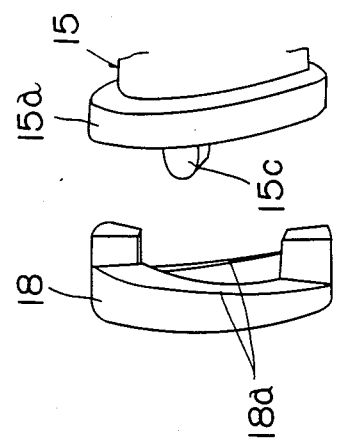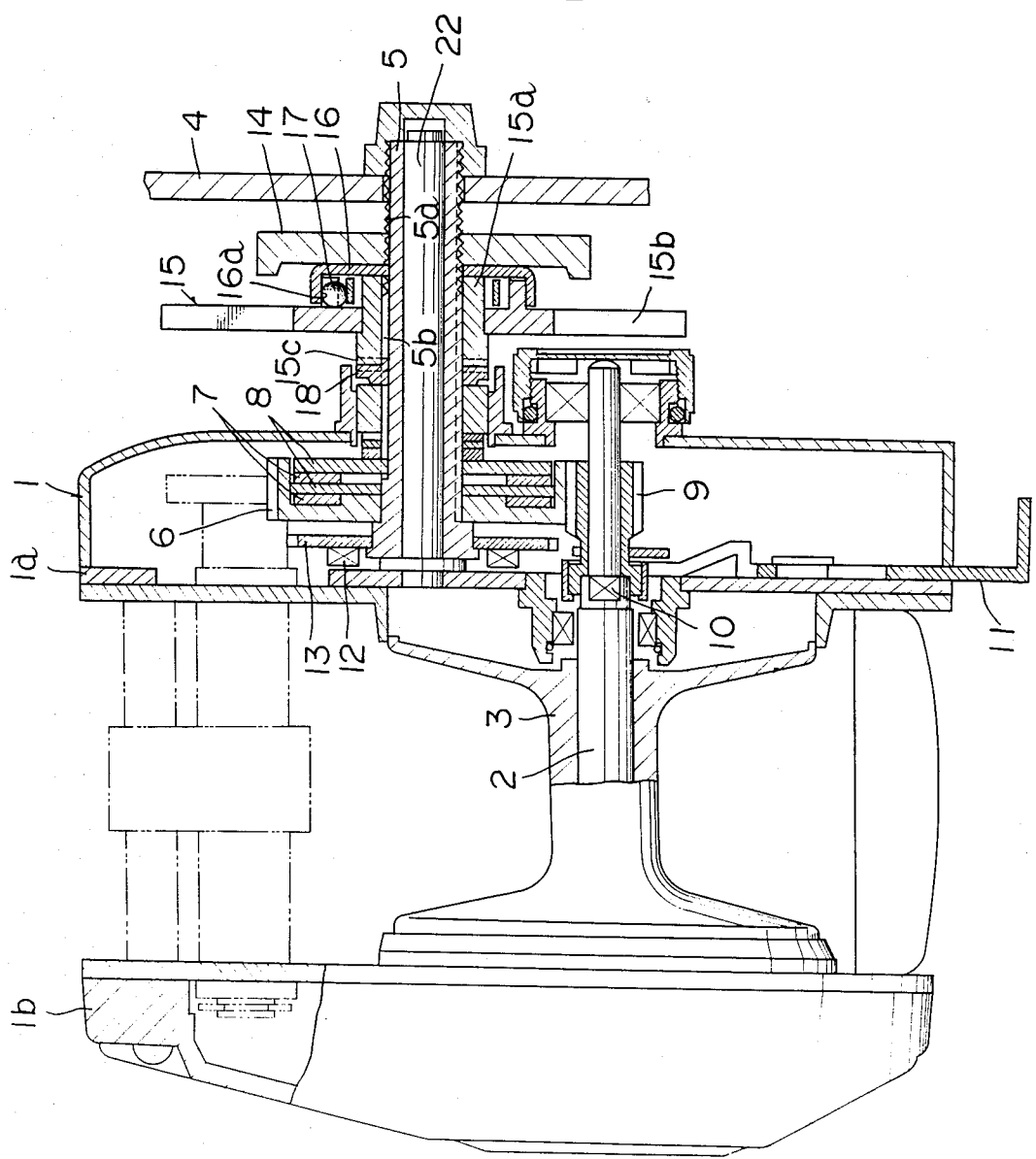

DRAG MECHANISM FOR A DOUBLE-BEARING FISHING REEL

FIELD OF THE INVENTION

The present invention relates to a drag mechanism for a double-bearing fishing reel, and more particularly, to a drag mechanism for a double-bearing fishing reel which rotatably supports a spool shaft having a spool to a reel body provided with a pair of side frames, the drag mechanism transmitting a driving force to a spool and applying the braking resistance against rotation of the spool when a driving mechanism ceases operation.

BACKGROUND OF THE INVENTION

A conventional drag mechanism for a double-bearing fishing reel, as disclosed in Japanese Utility Model Publication Gazette No. Sho 57-39,027, includes drag members interposed between a handle shaft rotatably supported to a reel body and a main gear supported rotatably with respect to the handle shaft, and includes an adjuster screwably supported to the handle shaft for applying a predetermined load to the drag members. The adjuster is rotatably operated so as to adjust the load applied to the drag members, in other words, to adjust a slipping rotation starting load on the spool.

More particularly the slipping rotation starting load on the spool set by the adjuster is set corresponding to the durability of a fishing line. When the load applied to the fishing line is smaller than the slipping rotation starting load, a driving force of the handle shaft is transmitted from the main gear to the spool and drives it. When the load is larger than the same, the drag members slip so as not to transmit the driving force thereto, or the spool slipping rotates even when the handle stops and also a predetermined braking action is exerted against rotation of the spool.

The adjuster sets the optimum slipping rotation starting load corresponding to a target fish in consideration of the durability of the fishing line, but adjusts the load corresponding to a pulling force of a hooked fish each time a new fish is hooked Since the adjuster is adapted to operate from a minimum to a maximum load applied to the drag members, it is very difficult to return the adjuster again to the position where the optimum load is applied after being rotatably operated corresponding to the pulling force of the hooked fish. Hence, the adjuster, even when previously positioned to obtain the optimum slipping rotation starting load for fishing the same general kinds of fishes, shifts each time a fish is hooked. Hence, the adjuster must be readjusted to obtain a optimum load, thereby creating the problem in that the fishing reel is inconvenient to use this yielding poor result.

SUMMARY OF THE INVENTION

An object of the invention is to provide a drag mechanism for a double-bearing fishing reel, which can (1) set a slipping rotation starting load on a spool to a desired optimum value by drag members, (2) adjust the optimum load by operating an adjuster, and (3) easily and accurately position the adjuster at the position where the preset optimum load is obtainable.

The drag mechanism of the double-bearing fishing reel of the invention applies a braking resistance against the relative rotation of the spool with respect to a driving mechanism for the spool, in other words, transmits a driving force therefrom to the spool and sets a slipping rotation starting load on the spool. The drag mechanism includes drag members disposed between a handle shaft rotatably supported to a reel body and a main gear rotatably supported relative to the handle shaft. A setting member is screwably mounted on the handle shaft to set the slipping rotation starting load on the spool. An adjuster is provided for adjusting in a predetermined range the slipping rotation starting load on the spool set by the setting member. A reference portion is provided at one of the setting member and the adjuster so as to set a reference for the slipping rotation starting load on the spool. A position is setting portion provided at the other of the setting member and adjuster so as to set the position of the adjuster with respect to the setting member corresponding to the reference portion.

In the condition where the position setting portion is coincident with the reference portion, the setting member is operated to preset the slipping rotation starting load on the spool to the optimum value corresponding to a target fish.

In this condition, the setting member is operated to set an initial load for the drag members, whereby the slipping rotation starting load on the spool applied by the drag members can be adjusted in a predetermined range with respect to the preset optimum load. Also, the adjuster is returned to the reference position where the reference portion is coincident with the position setting portion, and can easily and accurately be positioned to obtain the preset optimum load.

Therefore, even when the preset optimum load is adjusted each hooked fish, an angler can easily ascertain the proper position of the adjuster by the reference portion, whereby the angler needs only to allow the position setting portion to coincide with the reference portion. As a result, there is no need of adjusting the optimum load, so that the angler can avoid difficult and time-consuming adjustments.

The above and further objects and novel features of the invention will be more fully apparent from the following detailed description when the same is read in connection with the accompanying drawings.

DETAILED DESCRIPTION OF THE DRAWINGS

FIG. 1 is a partial sectional view of a first embodiment of a drag mechanism for a double-bearing fishing reel of the invention, FIG. 2 is a sectional view taken along line II—II in FIG. 1, FIG. 3 is a partial sectional view of the entire double-bearing fishing reel using the drag mechanism of the invention shown in FIGS. 1 and 2, FIG. 4 is a perspective view of a cam body only, and FIG. 5 is a partial sectional view of a second embodiment of the invention, corresponding to FIG. 1.

DETAILED DESCRIPTION OF THE INVENTION

A double-bearing fishing reel using the drag mechanism of the invention, as shown in FIG. 3, is constructed such that a spool 3 having a spool shaft 2 and a handle shaft 5 having a handle are rotatably supported to a reel body 1 which is provided with a pair of side frames 1a and 1b. Onto the handle shaft 5 are mounted a main gear 6 and drag members 7 abutting thereagainst and drag discs 8 abutting against the drag members 7 respectively. A pinion 9 engageable with the main gear 6 is slidably supported onto the spool shaft 2. A clutch means 10 is provided between the pinion 9 and the spool shaft 2, so that a driving force by rotation of the handle 4 is transmitted to the spool 3 through the handle shaft 5, drag members 7, main gear 6, pinion 9, clutch means 10 and spool shaft 2, thereby driving the spool 3. A clutch lever 11 is slidably supported to the first side frame 1a and is pushed to slide the pinion 9 so as to disconnect the clutch means 10. A return plate 13 having clutch pins 12 is supported on the handle shaft 5. Handle 4 is reversely rotated to allow the clutch pin 12 to hit the utmost end of clutch lever 11 so that the clutch lever 11 is returned, thereby engaging the clutch means 10. In addition, the drag members 7 and drag discs 8 are alternately disposed, the outermost drag disc 8 being non-rotatable but axially movable relative to the handle shaft 5.

In the first embodiment shown in FIGS. 1 through 4, a setting member 14 for setting a slipping rotation starting load on the spool 3 by the drag members 7 rotatably screws with the handle shaft 5. A adjuster 15 for adjusting in a predetermined range the slipping rotation starting load on the spool 3 set by the setting member 14 is rotatably supported between the setting member 14 and the main gear 6 and in turn the outermost drag disc 8. A reference member 16 having a reference portion 16a is supported non-rotatable but axially movable relative to the handle shaft 5. A position setting portion 17 corresponding to the reference portion 16a is provided at the adjuster 15.

In the above described construction, the handle shaft 5 is provided at its outer periphery with a screw thread 5a and a plurality of axially extending grooves 5b.

The setting member 14 has at its center a threaded bore and at its outer periphery a knob, the threaded bore screwing with the screw thread 5a of handle shaft 5.

The adjuster 15 comprises a boss 15a having a through bore to be fitted onto the outer periphery of the handle shaft 5 and operating portions 15b each extending radially from the outer periphery of the boss 15a, the through bore being movably fitted on the handle shaft 5 and boss 15a being provided at one end surface with two projections 15c axially projecting as shown in FIG. 4.

Also, between the adjuster 15 and the outermost drag disc 8 are interposed a cam body 18 having two cam faces 18a engageable with the projections 15c respectively, a bush 19, and a plurality of washers 20.

The cam body 18, as shown in FIG. 4, is annular, has a through bore fitted onto the handle shaft 5 and engaging projections engageable with the grooves 5b respectively. Cam body 18 is provided at one end surface with the cam faces 18a which have circumferentially shifted axial positions, i.e., faces 18a have a contour which has different axial heights circumferentially of cam 18, as shown in FIG. 4.

Also, the reference member 16 is provided with a disc 16c having a through bore fitted onto the handle shaft 5 and engaging projections 16b engageable with the grooves 5b respectively, and a ring 16d projecting from the outer periphery of the disc 16c axially from one side thereof. Ring 16d is provided at its inner surface with the recessed reference portion 16a.

The position setting portion 17 uses one ball which is held rollably by a holding portion 15d at a cylinder 15e projecting from one side surface of the adjuster 15. A ring spring 21 is provided inside the cylinder 15e, thereby biasing the position setting portion 17 toward the reference portion 16a. In addition, in FIGS. 1 through 3, a support shaft 22 is fixed to the side frame 1a for supporting the handle shaft 5.

The angler, when using the fishing reel constructed as described, rotatably operates the setting member 14 prior to fishing, and presets an optimum initial load for starting the slipping rotation of spool 3 corresponding to the kind and size of fish desired to be caught.

In this case, the position of each projection 15c with respect to the cam face 18a may be optional, but engages with, for example, a portion of intermediate axial height at the cam face 18a so that the position setting portion 17, in this condition, may coincide with the reference portion 16a. In addition, the position setting portion 17 and reference portion 16a may be preset such that the projection 15c, when engaging with the high level face or low level face of the cam face 18a, coincides with the reference portion 16a.

Thus, as described above, the optimum load is preset and the adjuster 15 is rotated to adjust the load of the drag members 7 with respect to the optimum load for fishing.

After fishing the hooked fish, the adjuster is returned to the position where the position setting portion 17 coincides with the reference portion 16a, thereby being easily and accurately positioned to obtain the preset optimum load.

Accordingly, the adjuster 15 can desirably adjust the optimum load corresponding to a pulling force of a fish each time it is hooked, and also easily and accurately return to the position where the optimum load is obtained, whereby the fishing reel is convenient and efficient to use and can yield good results. Also, the reference portion 16a engages with the position setting portion 17, so that the slipping rotation starting load on the spool 3 can be prevented from being excessively reduced, thereby preventing the fishing line from being loosened to become entangled due to the inertial rotation of the spool 3.

Alternatively, the reference portion 16a may be provided at the adjuster 15 and the position setting portion 17 may be provided at the handle shaft 5 through the reference member 16. Also, the reference portion 16a and position 17 may not engage but instead may coincide with each other, which construction is not particularly defined or limited.

Alternatively, instead of the cam body 18 and projection 15c in the above embodiment, a threaded member 23, for example as shown in FIG. 5, may be used and rotatably operated to control the drag members 7 and drag discs 8 by moving toward or away from them.

In a second embodiment shown in FIG. 5, the threaded member 23 having at its outer periphery a screw thread is includes at its axial center a through bore to be fitted onto the handle shaft 5 and projections engageable with the grooves 5b, thereby being axially movably supported to the handle shaft 5. An adjuster 150 having an operating portion 150b and a boss 150a is provided at its center with a threaded bore 150c, with which the threaded member 23 screws. Hence, the threaded member 23 screws forwardly or backwardly with respect to the adjuster 150 to adjust the load on the drag members 7 with respect to the preset optimum load. Also, the adjuster 150 can be returned to the position where the position setting portion 17 coincides with the reference portion 16a, thereby being positioned easily and accurately to regain the preset optimum load.

In addition, in FIG. 5, the adjuster 150, similarly to the first embodiment, has a cylinder 150e which is provided with a holding portion 150d for the position setting member 17 of the ball. Also, in FIG. 5, a reference numeral 24 designates a bush provided in alignment with the bush 19.

As seen from the above, the present invention includes setting member 14 mounted on the handle shaft 5 and is provided between the setting member 14 and the main gear 6 with the adjuster 15 and at one of the adjuster 5 and handle shaft 5 with the reference portion 16a and at the other with the position setting portion 17. Hence, in the condition where the reference portion 16a coincides with the position setting portion 17, the setting member 17 is operated to set the optimum load on the spool 3, whereby the adjuster 15 can be operated to desirably adjust the slipping rotation starting load on the spool 3 with respect to the preset optimum load. Moreover, the adjuster 15 can be returned to the position where the position setting portion 17 coincides with the reference portion 16a, thereby being easily and accurately positioned to obtain the set initial load.

Although several embodiments have been described, they are merely exemplary of the invention and not to be construed as limiting, the invention being defined solely by the appended claims.

What is claimed is:

1. A fishing reel comprising:
(a) a reel body;
(b) a handle shaft supported rotatably relative to said reel body;
(c) a spool supported rotatably relative to said reel body;
(d) a main gear supported rotatably relative to said handle shaft; and
(e) a drag mechanism for applying a braking force against rotation of said spool relative to said reel body, said drag mechanism comprising:
  (i) a plurality of drag members provided between said handle shaft and said main gear;
  (ii) a setting means, screwably engaged with said handle shaft, for setting a slipping rotation starting load on spool by said drag members; and
  (iii) an adjuster means for adjusting within a predetermined range said slipping rotation starting load on said spool set by said setting means, said adjuster means including means for establishing a reference position for said adjuster means corresponding to said slipping rotation starting load on said spool set by said setting means and means for indicating when said adjuster means, after adjusting the slipping rotation starting load on said spool set by said setting means, has returned to said reference position.

2. A fishing reel according to claim 1, further comprising a cam body disposed between said adjuster means and said drag members, said cam body having cam faces engaging with said adjuster means, said cam body being controlled by rotation of said adjuster means with respect to said drag members to move toward and away from said drag members to adjust braking force applied by said drag members.

3. A fishing reel according to claim 1, further comprising a threaded member disposed between said adjuster means and said handle shaft, said threaded member being controlled by rotation of said adjuster means with respect to said drag members to move toward and away from said drag members to adjust said braking force applied by said drag members.

4. A fishing reel, comprising:
(a) a reel body;
(b) a handle shaft supported rotatably relative to said reel body;
(c) a spool supported rotatably relative to said reel body;
(d) a main gear supported rotatably relative to said handle shaft; and
(e) a drag mechanism for applying a braking force against rotation of said spool relative to said reel body, said drag mechanism comprising:
  (i) a plurality of drag members provided between said handle shaft and said main gear;
  (ii) a setting means, screwably engaged with said handle shaft, for setting a slipping rotation starting load on said spool by said drag members;
  (iii) an adjuster means for adjusting within a predetermined range said slipping rotation starting load on said spool set by said setting means; and
  (iv) a reference member comprising a reference portion, said reference member being supported non-rotatably and axially movable relative to said handle shaft, said reference portion setting a reference position for said slipping rotation starting load on said spool, said adjuster means including a position setting portion for setting a position of said adjuster means with respect to said reference member corresponding to said reference portion.

5. A fishing reel according to claim 4, further comprising a cam body disposed between said adjuster means and said drag members, said cam body having cam faces engaging with said adjuster means, said cam body being controlled by rotation of said adjuster means with respect to said drag members to move toward and away from said drag members to adjust said braking force applied by said drag members.

6. A fishing reel according to claim 4, further comprising a threaded member disposed between said adjuster means and said handle shaft, said threaded member being controlled by rotation of said adjuster means with respect to said drag members to move toward and away from said drag members to adjust said braking force applied by said drag members.

7. A fishing reel comprising:
(a) a reel body;
(b) a spool supported for movement relative to said reel body, said spool being rotatable about its axis;
(c) a handle supported on a handle shaft;
(d) a drive mechanism for moving said spool relative to said reel body upon rotation of said handle;
(e) a drag mechanism for applying a braking force against rotation of said spool, said drag mechanism comprising:
  (i) at least one drag member provided to apply a drag force against rotation of said spool;
  (ii) means for setting an initial desired drag force which is applied to said spool by said at least one drag member;
  (iii) means for adjusting the drag force applied to said spool away from said initial desired drag force set by said setting means and within a predetermined drag force adjustment range; and
  (iv) means for determining when an applied drag force, adjusted within said range by said adjusting means, is returned by said adjusting means to said initial desired drag force set by said setting means.

8. A fishing reel as in claim 7 wherein said adjusting means includes a rotatable adjusting member and said determining means comprises a non-rotatable reference member, a reference means provided at said reference member for setting a reference position and a position setting means provided said adjusting means which moves in accordance with a deviation in an applied drag force caused by rotational movement of said adjusting member, said determining means determining that an applied drag force has returned to said initial desired drag force set by said setting means when said reference setting means and position setting means coincide with each other.

9. A fishing reel as in claim 8 wherein one of said reference means and position setting means provides a first engaging member and the other of said reference means and position setting means provides a second engaging member, said determining means determining a return to said initial desired drag force set by said setting means when there is engagement of said first and second engaging members.

10. A fishing reel comprising:
(a) a reel body;
(b) a handle shaft supported rotatably relative to said reel body;
(c) a spool supported rotatably relative to said reel body;
(d) a main gear supported rotatably relative to said handle shaft; and
(e) a drag mechanism for applying a braking force against rotation of said spool relative to said reel body, said drag mechanism comprising:
  (i) a plurality of drag members provided between said handle shaft and said main gear;
  (ii) a setting means, screwably engaged with said handle shaft, for setting a slipping rotation starting load on said spool by said drag members;
  (iii) an adjuster means for adjusting within a predetermined range said slipping rotation starting load on said spool set by said setting means; and
  (iv) a reference member comprising a reference portion, said reference member being supported non-rotatably to said handle shaft, said reference portion setting a reference position for said slipping rotation starting load on said spool, said adjuster means including a position setting portion for setting a position of said adjuster means with respect to said reference member corresponding to said reference portion.

* * * * *